(12) United States Patent
Li

(10) Patent No.: US 8,532,138 B2
(45) Date of Patent: Sep. 10, 2013

(54) WWAN TO ETHERNET CONVERTER AND COMMUNICATION SYSTEM THEREOF

(75) Inventor: Cheng-Yen Li, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 616 days.

(21) Appl. No.: 12/718,243

(22) Filed: Mar. 5, 2010

(65) Prior Publication Data

US 2010/0246488 A1 Sep. 30, 2010

(30) Foreign Application Priority Data

Mar. 27, 2009 (TW) ................................ 98110249 A

(51) Int. Cl.
H04J 3/16 (2006.01)
H04J 3/22 (2006.01)
H04W 4/00 (2009.01)
H04L 29/06 (2006.01)

(52) U.S. Cl.
CPC ................................ H04L 29/06068 (2013.01)
USPC .......................................... 370/466; 370/328

(58) Field of Classification Search
USPC ........................... 370/328, 353, 466, 338, 467
See application file for complete search history.

(56) References Cited

U.S. PATENT DOCUMENTS

| 7,890,672 | B2 * | 2/2011 | Kato ................................ 710/22 |
| 8,155,155 | B1 * | 4/2012 | Chow et al. ..................... 370/485 |
| 2002/0163902 | A1 * | 11/2002 | Takao et al. .................... 370/338 |
| 2003/0156567 | A1 * | 8/2003 | Oak ................................ 370/338 |
| 2004/0198469 | A1 * | 10/2004 | Kurokawa ..................... 455/574 |
| 2005/0200456 | A1 * | 9/2005 | Bridgelall ..................... 340/10.1 |
| 2007/0019959 | A1 * | 1/2007 | Retnasothie et al. ......... 398/115 |
| 2007/0133496 | A1 * | 6/2007 | Barratt et al. ................. 370/343 |
| 2007/0230426 | A1 * | 10/2007 | Beach ........................... 370/338 |
| 2008/0254833 | A1 * | 10/2008 | Keevill et al. ................. 455/558 |
| 2008/0268778 | A1 * | 10/2008 | De La Garrigue et al. .. 455/41.2 |
| 2008/0280569 | A1 * | 11/2008 | Hazani et al. ................. 455/74.1 |
| 2009/0227234 | A1 * | 9/2009 | Bosch et al. .................. 455/411 |
| 2010/0027516 | A1 * | 2/2010 | Nagarajan .................... 370/338 |
| 2010/0067426 | A1 * | 3/2010 | Voschina et al. ............. 370/313 |
| 2010/0111013 | A1 * | 5/2010 | Chou ............................ 370/329 |
| 2010/0124921 | A1 * | 5/2010 | Carmon ..................... 455/426.1 |
| 2010/0220700 | A1 * | 9/2010 | Hodroj et al. ................. 370/338 |
| 2010/0254379 | A1 * | 10/2010 | Fukuda ......................... 370/389 |
| 2011/0205911 | A1 * | 8/2011 | Kim et al. ..................... 370/252 |
| 2011/0281530 | A1 * | 11/2011 | Hazani et al. ................ 455/74.1 |

* cited by examiner

*Primary Examiner* — Ayaz Sheikh
*Assistant Examiner* — Hoang-Chuong Vu
(74) *Attorney, Agent, or Firm* — Edell, Shapiro & Finnan, LLC

(57) ABSTRACT

A wireless wide area network (WWAN) to Ethernet converter comprises a subscriber identity module (SIM) interface, for accessing data stored in a SIM card; a radio frequency (RF) circuit, for receiving in the WWAM an RF signal associated with the data stored in the SIM card and for converting between the RF signal and a baseband signal; a digital signal processor (DSP), coupled to the RF circuit, for processing the baseband signal; and an Ethernet control device, coupled to the DSP, for converting between the processed baseband signal and an Ethernet signal.

5 Claims, 3 Drawing Sheets

US 8,532,138 B2

WWAN TO ETHERNET CONVERTER AND COMMUNICATION SYSTEM THEREOF

CROSS REFERENCE TO RELATED PATENT APPLICATION

This patent application is based on Taiwan, R.O.C. patent application No. 98110249 filed on Mar. 27, 2009.

FIELD OF THE INVENTION

The present invention relates to a communication system, and more particularly, to a wireless wide area network (WWAN) to Ethernet converter and a communication system thereof.

BACKGROUND OF THE INVENTION

The mobile telecommunication cellular network provides substantial communication convenience to people. Although the modern mobile telecommunication cellular network is capable of proving all types of voice and data communication services, compared to a wired network such as a local area network (LAN), the mobile telecommunication cellular network has far less bandwidth and reliability than the wired network. Furthermore, since there are many service providers for the mobile telecommunication cellular network, communication between two mobile phones from two different service providers may cost more than the two mobile phones using a same service provider. Although a communication application that integrates wireless regional area network (WRAN) technology such as Wi-Fi with Internet phone technology such as VoIP has been developed to reduce communication fees, operative coverage and popularity of the WRAN are lackluster, such that these types of applications have not effectively achieved the intended market penetration.

Remote control is one of the numerous applications of mobile communication, and a user may use a mobile phone to control a remote electronic device or computer. Since this type of application system uses the Internet to control the electronic device or computer connected to it, the electronic device or computer needs its own exclusive and fixed Internet protocol (IP) address to perform the remote control—such a prerequisite imposes an unfavorable factor on the prevalence of the application of remote control.

In view of the foregoing, there is a need for a new device and a system, which are capable of achieving free mobile communication without changing current mobile networks or Internet structures, such that high bandwidth and high stability of a wired regional network are effectively implemented. In addition, remote control of a device or computer can be performed even without exclusive and fixed (e.g., IP) addresses.

SUMMARY OF THE INVENTION

One object of the present invention is to provide a WWAN to Ethernet converter and a communication system thereof, which are capable of effectively implementing high frequency band and high stability of a wired regional network and providing remote control of a device or computer.

According to an embodiment of the present invention, a converter comprises: a subscriber identity module (SIM) interface, for accessing data stored in a SIM card; a radio frequency (RF) circuit, for receiving within a WWAN an RF signal associated with the data stored in the SIM card, and converting between the RF signal and a baseband signal; a digital signal processor (DSP), coupled to the RF circuit, for processing the baseband signal; and an Ethernet control device, coupled to the DSP, for converting between the processed baseband signal and an Ethernet signal.

According to an embodiment of the present invention, when a first communication device and a second communication device are from a same service provider, the first communication device applies a first signal converter to communicate with the second communication device via a WWAN, or the first communication device directly communicates with the second communication device via the WWAN. When the first communication device and the second communication device are from different service providers, the first communication device communicates with the second communication device through the first signal converter, the Internet and a second signal converter.

According to another embodiment of the present invention, a first communication device may control a first modem and an electronic device at a remote end through a first signal converter, or control another electronic device at the remote end through the first signal converter, the first modem and the Internet. Alternatively, the first communication device may use the first signal converter to control the remote electronic device directly coupled to the first signal converter.

DETAILED DESCRIPTION OF THE PREFERRED EMBODIMENT

Figure 1:
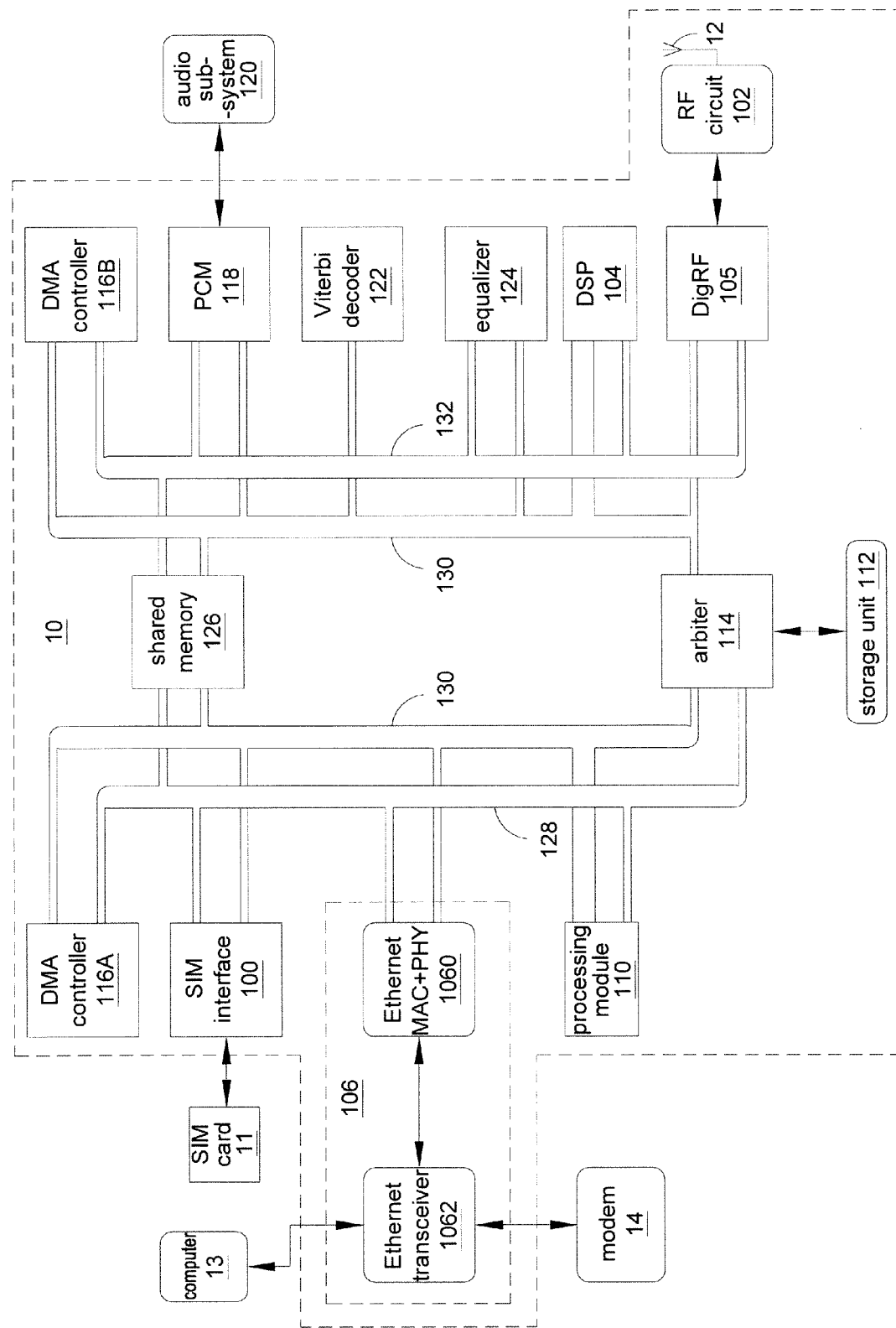
FIG. 1 is a schematic diagram of a WWAN to Ethernet converter in accordance with an embodiment of the present invention.

FIG. 1 shows a WWAN to Ethernet converter 10 in accordance with an embodiment of the present invention. The WWAN may be but not limited to a mobile telecommunication cellular network, which is based on a specification such as Worldwide Interoperability for Microwave Access (WIMAX), Universal Mobile Telecommunications System (UMTS), General Packet Radio Services (GPRS), Global System for Mobile Communications (GSM), Code Division Multiple Access (CDMA) CDMA2000, Wideband CDMA (WCDMA) or High-Speed Downlink Packet Access (HSDPA). In this embodiment, the converter 10 comprises a SIM card interface 100, an RF circuit 102, a digital signal processor (DSP) 104 and an Ethernet control device 106. The SIM interface 100 accesses data stored in a SIM card 11, e.g., phone numbers and a personal identification number (PIN). The RF circuit 102 receives or transmits through an antenna 12 in the WWAN an RF signal corresponding to the data, e.g., the phone numbers stored in the SIM card. The RF circuit 102 converts the received RF signal to a baseband signal or converts the baseband signal to an RF signal to be transmitted. The DSP 104, coupled to the RF circuit 102 through a DSP/direct memory access (DMA) bus 132 and a digital baseband/RF (DigRF) interface 105, processes the baseband signal. The Ethernet control device 106, coupled to the DSP 104, converts between the processed baseband signal and an Ethernet signal. In this embodiment, the Ethernet control device 106, following the IEEE 802.3 specification, mainly comprises a media access control (MAC)/physical layer PHY module 1060, and an Ethernet transceiver 1062. The converter 10 connects to an external computer 13 or a modem 14 through the Ethernet transceiver 1062.

The converter 10 further comprises a processing module 110 such as a micro-controller unit (MCU), and is coupled to the DSP 104 and the Ethernet control device 106 through a basic virtual component interface/advanced microcontroller bus architecture such as a Basic Virtual Component Interface/Advanced Microcontroller Bus Architecture bus (BVCI/AMBA Bus) 130 and a Multi-Communications Device (MCD) DMA Bus 128, respectively. The processing module 110 determines to transmit the processed baseband signal to the Ethernet control device 106 or the DSP 104 according to content of the processed baseband signal. Specifically, the processed baseband signal comprises a first message of a destination, and a storage unit 112 coupled to the processing module 110 stores a plurality of second messages. The processing module 110 compares the first message to the plurality of second messages to generate a comparison result, and determines to transmit the processed baseband signal to the Ethernet control device 106 or the DSP 104 according to the comparison result. For example, when the comparison result indicates that the first message corresponds to one of the plurality of second messages, the processing module 110 transmits the processed baseband signal to the DSP 104, and generates and transmits another RF signal via the RF circuit 102. On the contrary, when the comparison result indicates that the first message does not correspond to any of the plurality of second messages, the processing module 110 transmits the processed baseband signal to the Ethernet control device 106 to generate an Ethernet signal. In this embodiment, the converter 10 further comprises an arbiter 114 for coordinating the DSP 104 and the processing module 110.

In addition, the converter 10 further comprises other devices and circuits, for example, it comprises DMA controllers 116A and 116B, for controlling memory access requirements of the storage unit 112; a pulse code modulation (PCM) 118 for controlling an audio sub-system 120; a Viterbi decoder 122 for decoding signals; an equalizer 124 for adjusting frequency spectrum factors; and a shared memory 126.

Figure 2:
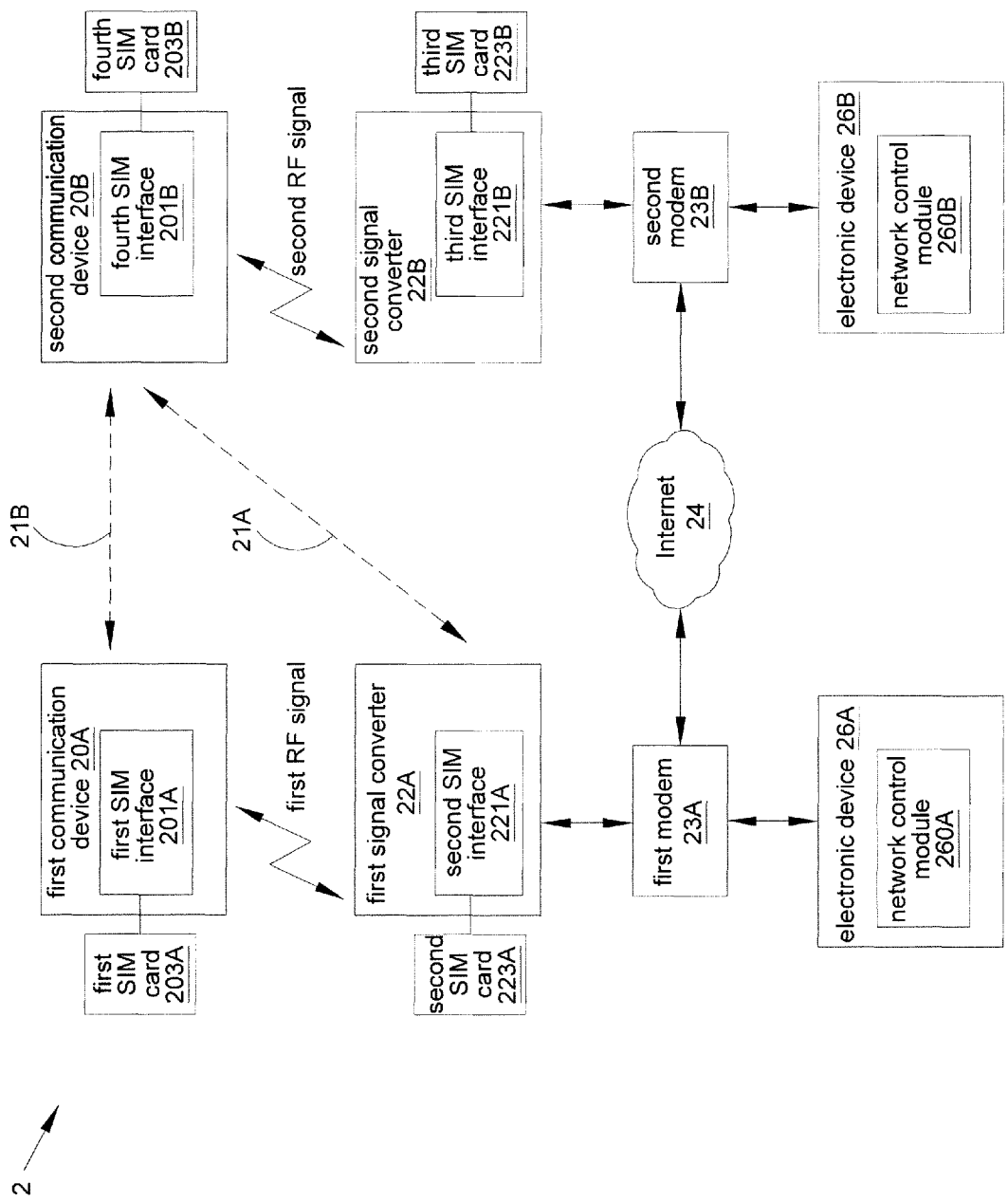
FIG. 2 is a schematic diagram of a data transmission system between a WWAN and an Ethernet in accordance with an embodiment of the present invention.

With the foregoing architecture of converter 10 in mind, FIG. 2 shows a data transmission system 2 between a WWAN and an Ethernet in accordance with an embodiment of the present invention. The data transmission system 2 mainly comprises a first communication device 20A and a first signal converter 22A. The first communication device 20A (e.g., a mobile phone) operative within the WWAN has a first SIM interface 201A for accessing data stored in a first SIM card 203A. The first communication device 20A generates a first RF signal, which is associated with the first SIM card 203A and a second SIM card 223A, and comprises predetermined data such as digital data, audio data or video data. The first signal converter 22A (e.g., the converter 10 illustrated in FIG. 1) has a second SIM interface 221A for accessing data stored in the second SIM card 223A. In an embodiment, the first SIM card 203A and the second SIM card 223A are from a same service provider. When the first communication device 20A calls the first signal converter 22A, since the first RF signal is associated with the data stored in the second SIM card 223A, the first signal converter 22A receives and converts the first RF signal to an Ethernet signal, such that the predetermined data is transmitted via the Ethernet.

The data transmission system 2 further comprises a second communication device 20B and a second signal converter 22B. The second signal converter 22B (e.g., the converter 10 illustrated in FIG. 1) is coupled to the first signal converter 22A via the Internet 24 (e.g., an Ethernet) through a first modem 23A and a second modem 23B. The second signal converter 22B has a third SIM interface 221B for accessing data stored in a third SIM card 223B. The second signal converter 22B also receives an Ethernet signal from the first signal converter 22A via the Internet 24, converts the Ethernet signal to a second RF signal associated with data stored in the third SIM card 223B and a fourth SIM card 203B, and transmits the predetermined data via the WWAN. In addition, the second communication device 20B (e.g., a mobile phone), operative within the WWAN, has a fourth SIM interface 201B for accessing data stored in the fourth SIM card 203B. In an embodiment, the third SIM card 223B and the fourth SIM card 203B are from a same service provider. When the second signal converter 22B calls the second communication device 20B, since the second RF signal is associated with data stored in the fourth SIM card 203B, the second communication device 20B receives the second RF signal and receives the predetermined data via the WWAN.

The data transmission system 2 may comprise an electronic device 26A (e.g., a computer) coupled to the first signal converter 22A in a same LAN through a network control module 260A and a first modem 23A, and the electronic device 26A is used for receiving the Ethernet signal and obtaining the predetermined data. The data transmission system 2, comprising another electronic device 26B (e.g., a computer) coupled to the first signal converter 22A through the second module 23B and the Internet 24, is used for receiving the Ethernet signal and obtaining the predetermined data. Generally, the electronic device 26B comprises an Internet protocol (IP) address, with which the Ethernet signal is associated.

In an example of the data transmission system 2, when the first communication device 20A (e.g., a mobile phone) wishes to communicate with the second communication device 20B (e.g., a mobile phone), the first communication device 20A transmits a message associated with the second communication device 20B to the first signal converter 22A. The processing module 110 of the first signal converter 22A then prompts the data transmission system 2 according to the message to selectively perform one of following operations.

Under a first condition that it is determined the first communication device 20A and the second communication device 20B are from a same service provider, that is, the first SIM card 203A and the fourth SIM card 203B are from a same service provider, since under this situation communication fees are rather low, the first communication device 20A communicates with the second communication device 20B (referring to a route 21A illustrated in FIG. 2) via the WWAN (or a mobile communication network) through the first signal converter 22A.

Under a second condition that it is determined that the first communication device 20A is from a different service provider from the second communication device 20B, that is, the first SIM card 203A and the fourth SIM card 203B are from different service providers, since under this situation communication fees are rather high, the first communication device 20A communicates with the second communication device 20B through the first signal converter 22A, the Internet 24, the second signal converter 22B and the second communication device 20B, so as to reduce the communication fees. Particularly, the first signal converter 22A first converts the RF signal of the first communication device 20A to a first Ethernet signal for controlling the first modem 23A. A second Ethernet signal is then generated via the Internet 24 and the second modem 23B, and the second signal converter 22B converts the second Ethernet signal to a second RF signal to be transmitted to the second communication device 20B.

Under a third condition, with respect to the situation that the first communication device 20A and the second communication device 20B are from a same service provider, another approach that the first communication device 20A directly communicates with the second communication device via the WWAN (referring to a route 21B illustrated in FIG. 2) may also be implemented.

Figure 3:
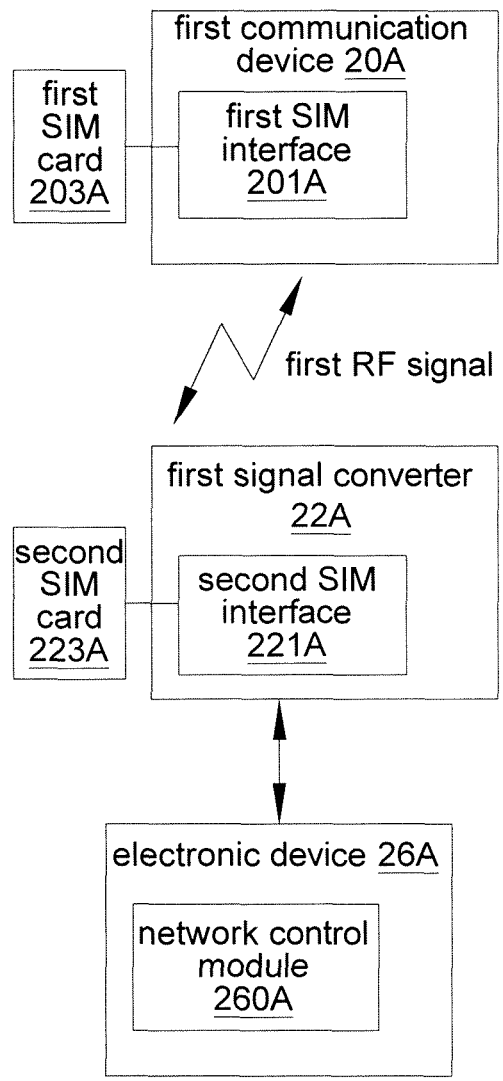
FIG. 3 shows a schematic diagram of a remote control system between a WWAN and an Ethernet in accordance with another embodiment of the present invention.

In another application of the data transmission system 2, when the first communication device 20A (e.g., a mobile phone) wishes to control the electronic device 26A (e.g., a computer), the first signal converter 22A first receives an RF signal from the first communication device 20A. After processing (e.g., decoding) the RF signal to a baseband signal, the first signal converter 22A converts the processed baseband signal to an Ethernet signal for controlling the first modem 23A and the electronic device 26A (referring to FIG. 2) coupled to the first modem 23A or directly controlling the electronic device 26A (referring to FIG. 3). In the situation that the first communication device 20A and the second communication device 20B are from different service providers, referring to FIG. 3, the electronic device 26A is directly coupled to the first signal converter 22A through the network control module 260A instead of the first modem 23A to receive the Ethernet signal. In the foregoing examples of remote control, the electronic device 26A needs no exclusive and fixed IP address. Therefore, the first communication device 20A directly controls the electronic device 26A through the first signal converter 22A. In another example of remote control, referring to FIG. 2, the first communication device 20A controls another electronic device 26B (e.g., a computer) through the first signal converter 22A, the first modem 23A, the Internet 24 and the second modem 23B.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless wide area network (WWAN) to Ethernet converter, comprising:
    a subscriber identity module (SIM) interface, for accessing data stored in a SIM card;
    a radio frequency (RF) circuit, for receiving within the WWAN an RF signal associated with the data stored in the SIM card, and converting between the RF signal and a baseband signal;
    a digital signal processor (DSP), for processing the baseband signal;
    an Ethernet control device, for converting between the processed baseband signal and an Ethernet signal;
    a processing module, coupled to the Ethernet control device, for determining whether to transmit the processed baseband signal to the Ethernet network control device or to the DSP according to the processed baseband signal; wherein the processed baseband signal comprises a first message associated with a destination for the RF signal; and
    a storage unit, for storing a plurality of second messages; wherein, the processing module compares the first message to the plurality of second messages to generate a comparison result, and determines whether to transmit the processed baseband signal to the Ethernet control device or to the DSP to generate another RF signal via the RF circuit according to the comparison result.

2. The converter as claimed in claim 1, wherein when the comparison result indicates that the first message corresponds to one of the plurality of second messages, the processing module transmits the processed baseband signal to the DSP, and generates another RF signal via the RF circuit.

3. The converter as claimed in claim 1, wherein when the comparison result indicates that the first message does not correspond to any of the plurality of second messages, the processing module transmits the processed baseband signal to the Ethernet control device to generate the Ethernet signal.

4. The converter as claimed in claim 1, further comprising:
    an arbiter, for coordinating the DSP and the processing module.

5. The converter as claimed in claim 1, wherein the WWAN is a mobile telecommunication cellular network.

* * * * *